United States Patent [19]

Abe et al.

[11] 4,404,071

[45] Sep. 13, 1983

[54] METHOD OF TREATING ELECTROLYTIC SOLUTION OF COPPER FOR PURIFICATION AND REUSE THEREOF

[75] Inventors: Hideki Abe, Honjyo; Kiyomi Yamaguchi; Yuzo Asano, both of Kosaka, all of Japan

[73] Assignee: Dowa Mining Co., Ltd., Tokyo, Japan

[21] Appl. No.: 372,230

[22] Filed: Apr. 26, 1982

Related U.S. Application Data

[63] Continuation-in-part of Ser. No. 225,135, Jan. 14, 1981, abandoned.

[30] Foreign Application Priority Data

Jun. 14, 1980 [JP] Japan ................................ 55-80709

[51] Int. Cl.$^3$ ............................................... C25R 1/12
[52] U.S. Cl. .................................... 204/108; 204/130; 423/87; 423/561 R
[58] Field of Search ......................... 423/87, 561 R; 204/106–108, 130

[56] References Cited

U.S. PATENT DOCUMENTS

| | | | |
|---|---|---|---|
| 1,148,522 | 8/1975 | Martin et al. | 204/108 |
| 3,887,448 | 6/1975 | Schulze | 204/108 |
| 3,919,062 | 11/1975 | Lindquist, Jr. | 204/130 |

OTHER PUBLICATIONS

"Common Operations", *Applied Inorganic Analysis* by Hillebrand et al., J. Wiley & Sons, 1962, pp. 58–59.
Encyclopedia of Chem. Reactions by C. A. Jacobson, vol. 1, 1946, Reinhold Publ. Co., 1946, pp. 330, 402, 414.
Gen. Chem., by H. H. Sisler et al., 1949, p. 545.

*Primary Examiner*—R. L. Andrews
*Attorney, Agent, or Firm*—Frishauf, Holtz, Goodman & Woodward

[57] ABSTRACT

There is disclosed an improved method of treating a spent electrolyte of copper from a cell for electrolytic refining of copper for the purpose of purification and reuse of the spent electrolyte. The process comprises the steps of: pretreating the spent electrolyte for removing copper therefrom until the copper content is greatly reduced but still remains at a level which is substantially higher than the total content of various metal ion impurities, preferably to a concentration of 10–13 g/l of Cu; blowing a hydrogen sulfide gas into the pretreated solution at a temperature of 40° C. or higher until the redox potential of solution becomes a certain predetermined value to precipitate metal ions; filtering the treated solution to separate the residue available as a raw material for copper smelting from a filtrate which consists essentially of sulfuric acid; and returning the filtrate to the cell for electrolytic refining of copper.

11 Claims, No Drawings

METHOD OF TREATING ELECTROLYTIC SOLUTION OF COPPER FOR PURIFICATION AND REUSE THEREOF

This application is a continuation in part application of Ser. No. 225,135 filed Jan. 14, 1981 now abandoned.

This invention relates to an improved method of treating a waste electrolytic solution of copper for purification and resuse thereof. More particularly the invention relates to such treatment of a waste electrolytic solution taken out of a cell for elctrolytic refining of copper.

In electrolytic refining of copper, one of the process steps generally employed in copper metallurgy, various impurities such as arsenic, bismuth, antimony, nickel and the like contained in an anode copper dissolve into an electolytic solution during electrolysis. These impurities do not precipitate in the form of solids but accumulate in the form of metal ions in the electrolytic solution. When the concentrations of these metal ions are above a certain level, respectively, the ions deposit on the surface of the cathode copper to impair the quality thereof. In addition, the presence of nickel ions in the electrolytic solution raises the electrolytic voltage, while antimony ions present in the same solution generally change to floating substances due to hydrolysis or the like reactions. These floating substances are ready to evolve into an anode slime comprising various metallic particles which attaches to the surface of the cathode plate. For These reasons, the electrolytic solution in the cell must be purified from time to time.

One method for carrying out such purification is to take part of the electrolytic solution from the cell and purify it by first removing copper therefrom by electrolytic winning or the like suitable means and then subjecting it to further treatment to remove various other metal impurities, said further treatment including solvent extraction for removing arsenic, adsorption onto tin oxide for removing bismuth and antimony and other known suitable means for removing various other metal impurities. Alternatively, part of the electrolytic solution is taken out of the closed circulating system of the electrolytic solution and discarded for the purpose of preventing accumulation of undesired impurities in the electrolytic solution.

However, the former solvent extraction and adsorption by tin oxide method has a defect in that it is unable to remove arsenic, bismuth and antimony at the same time—that is, by one step treatment. On the other hand, the latter method of occasionally or periodically discarding part of the electrolytic solution is uneconomical in that it requires the loss of a substantial amount of sulfuric acid and also involves additional expenditure because the acid must be neutralized before it is discarded.

Martin et al U.S. Pat. No. 1,148,522 teaches the removal of arsenic impurity from a copper-refining electrolyte by a process which comprises removing the copper and then adding a reducing agent preferably sulfurous acid gas to precipitate the arsenic. This Martin et al process is considered to be the prior art closest to the process of the present invention. However, this process is defective in the following points.

In the process of Martin et al, arsenious acid is produced. It is well known that arsenious acid is very poisonous. Martin et al also states that the produced arsenious acid drops out as a gray residue mixed more or less with carbon, and that the purified sulfuric acid solution is to be siphoned off. As is easily understood by those versed in the art, solid-liquid separation by siphoning is rather troublesome and yet provides rather imcomplete separation. The discription in column 1, lines 18–20 shows that Martin et al wished to remove arsenic with the least possible mixing with other metals. The description in column 1, lines 24–26 shows that Martin et al wished to remove copper from the solution as completely as possible before the solution was subjected to the treatment for removing arsenic therefrom. To remove arsenic with the least amount of other impurities means that another treatment is necessary for removing other impurities. To remove copper as completely as possible by the pretreatment is desirable from the view point of avoiding loss of copper. However, if the copper content of an electrolyte becomes too low such as, for example, less than 10 g/l, current efficiency in the electrolysis as a pretreatment becomes too poor, and also, the grade or purity of copper obtained on a cathode as a deposit becomes too low, and accordingly the product obtained by casting such deposit copper will not be acceptable as a commercial product. Further, if the copper content of an electrolyte becomes as low as the content of other impurities such as arsenic, a precipitated product, if such is formed for separation from the solution, becomes a complex mixture of many impurities, which is very difficult to be further treated for the recovery of respective valuable metals independently, separated from one another.

We have studied hard to find how to eliminate these defects inherent in the prior art methods as discussed above, and have finally accomplished the present invention. According to the present invention, there is provided an improved method of treating a waste electrolytic solution of copper for the purification and reuse thereof.

The method of the present invention comprises: pretreating a spent electrolytic solution of copper containing a major amount of copper and a minor amount of various metal ion impurities containing arsenic, typically a spent electrolytic solution of copper taken out of a cell for electrolytic refining of copper, to remove a substantial amount of copper therefrom until the copper content is greatly reduced but still remains at a level which is substantially larger than the total amount of other metal ion impurities such as arsenic, bismuth, antimony, nickel and the like, said level generally being from 5 to 20 g/l of copper, preferably from 8 to 15 g/l of copper, and more preferably from 10 to 13 g/l of copper; blowing a hydrogen sulfide gas into the pretreated electrolytic solution at an elevated temperature of 40° C. or higher until the redox potential of the solution reaches a certain predetermined value to thereby precipitate the metal ions present in the electrolytic solution; filtering the thus treated electrolyte to separate a precipitated portion as a residue which can be used as a raw material in a dry copper smelting process from a filtrate consisting essentially of sulfuric acid; and then returning the filtrate to a copper electrolytic cell for reuse. Said temperature may be in the range of 40° C.–90° C., but is preferably between 50° C. and 70° C., with about 60° C. being the most preferred.

According to this method of the present invention, almost all of the metal components such as copper, bismuth, arsenic, antimony, silver, etc., remaining in the pretreated spent electrolytic solution of copper can be recovered in the forms of sulfides of respective metals, and the mixture of sulfides thus recovered can be used as raw material of copper in admixture with a major copper raw material comprising sulfide minerals in a dry process of copper smelting. The filtrate separated from said mixture of sulfides of metals can be returned to the cell for the electrolytic refining of copper for reuse as sulfuric acid solution. Thus, the advantages of the present invention are highly evaluated from a practical viewpoint in spite of the simplicity of the method.

The pretreatment of the spent electrolytic solution for removing copper therefrom can be carried out by means of the known electrolytic extraction method, though any other known method suitable for such purposes can also be used. The amount of hydrogen sulfide gas to be blown into the pretreated spent electrolytic solution varies depending on the concentrations of metal ions in the solution, though it has been confirmed that the amount of hydrogen sulfide which ensures the redox potential determined by platinum electrodes to be in the range of 200 mV–300 mV, preferably about 230 mV to about 280 mV is satisfactory for the intended purpose. The invention will be further illustrated by the following examples.

EXAMPLE 1

The continuous treatment of a spent electrolyte of copper was carried out according to the following procedures.

The spent electrolyte taken out of the cell for electrolytic refining of copper which had been pretreated for removing copper therefrom by the electrolytic extraction method (hereunder referred to as "Cu-removed spent electrolyte") and hydrogen sulfide gas were simultaneously and continuously fed to a 5 liter-capacity reaction vessel at such a flow rate that the residence time of the "Cu-removed spent electrolyte solution" in the reaction vessel was 1.5 hours. The reaction was carried out at a temperature of 60° C. and at the redox potential determined by platinum electrodes of 280 mV. Filtration was also conducted continuously by using a vacuum filter with a sheet of filter paper. The analytical results of the filtrate and the degree of removal of each metal component calculated therefrom are as given in Table 1 below. The residue was a mixture of sulfides of various kinds of metals. This mixture of sulfides was available as one of the raw materials for use in a copper smelting process. The concentration of sulfuric acid in the "Cu-removed spent electrolyte" was 252 g/l. The filtrate was available as an electrolytic solution to be recycled to the cell for electrolytic refining of copper.

TABLE 1

|  | Cu (g/l) | Degree of removal (%) | As (g/l) | Degree of removal (%) | Sb (g/l) | Degree of removal (%) | Bi (g/l) | Degree of removal (%) |
| --- | --- | --- | --- | --- | --- | --- | --- | --- |
| Cu-removed spent electrolyte | 10.4 |  | 3.3 |  | 0.39 |  | 0.023 |  |
| Purified electrolytic solution No. 1 | 0.8 | 92.3 | 2.0 | 39.4 | 0.18 | 53.8 | N.D.* | 100 |
| Purified electrolytic solution No. 2 | 1.0 | 90.2 | 2.0 | 39.4 | 0.14 | 64.1 | N.D. | 100 |
| Purified electrolytic solution No. 3 | 1.1 | 89.4 | 2.1 | 36.4 | 0.19 | 51.3 | N.D. | 100 |
| Purified electrolytic solution in average | 1.0 | 90.6 | 2.0 | 38.4 | 0.17 | 56.4 | N.D. | 100 |

*N.D. = not detected

EXAMPLE 2

The continuous treatment of a spent electrolyte of copper was carried out in the same manner as mentioned in Example 1 except that the residence time of the Cu-removed spent electrolyte in the reaction vessel was 5.4 hours, the temperature of the electrolytic solution was 60° C., and the redox potential determined by platinum electrodes was 230 mV. The analytical results of the filtrate and the degree of removal of each metal component calculated therefrom are as given in Table 2 below.

The concentration of sulfuric acid in the "Cu-removed spent electrolyte" used as the original feed to the reaction vessel was 250 g/l. The residue obtained in the filtration step was a mixture of sulfides of various kinds of metals. This mixture of sulfides was available as part of the raw material for use in a copper smelting process. The filtrate was substantially free of undesirable metal ions and was available as recycled electrolytic solution to feed to the cell for electrolytic refining of copper.

TABLE 2

|  | Cu (g/l) | Degree of removal (%) | As (g/l) | Degree of removal (%) | Sb (g/l) | Degree of removal (%) | Bi (g/l) | Degree of removal (%) |
| --- | --- | --- | --- | --- | --- | --- | --- | --- |
| Cu-removed spent electrolyte | 13.4 |  | 2.8 |  | 0.33 |  | 0.036 |  |
| Purified | 0.28 | 97.9 | 0.23 | 91.8 | 0.037 | 88.8 | N.D. | 100 |

TABLE 2-continued

|  | Cu (g/l) | Degree of removal (%) | As (g/l) | Degree of removal (%) | Sb (g/l) | Degree of removal (%) | Bi (g/l) | Degree of removal (%) |
| --- | --- | --- | --- | --- | --- | --- | --- | --- |
| electrolytic solution No. 1 |  |  |  |  |  |  |  |  |
| Purified electrolytic solution No. 2 | 0.27 | 98.0 | 0.20 | 92.9 | 0.032 | 90.3 | N.D. | 100 |
| Purified electrolytic solution No. 3 | 0.30 | 97.8 | 0.12 | 95.7 | 0.037 | 88.8 | N.D. | 100 |
| Purified electrolytic solution in average |  | 97.9 |  | 93.5 |  | 89.3 |  | 100 |

As is obvious from the results shown in the above examples, the process of the present invention is certainly different from such a prior art process as Martin et al particularly in the aspect that in our process a relatively large amount of copper still remains in the solution even after the pretreatment thereof for removing copper. Example 1 in the present application shows that the Cu-removed spent electrolyte still contains as much as 10.4 g/l of copper, and Example 2 also shows that the Cu-removed spent electrolyte still contains as much as 13.4 g/l of copper. We want to emphasize that the present invention has been accomplished based on the bold idea that we might get a substantial advantage by treating with hydrogen sulfide the spent electrolyte still containing a relatively large amount of copper together with a small amount of each of the undesirable impurities such as As, Sb, Bi, etc., so as to precipitate the whole lot of metal ions including said substantial amount of Cu as well as the impurities referred to above. As seen in Examples 1 and 2 above, the copper content of the electrolyte herein used is much larger than the total content of the accompanying impurities to be removed. In Example 1, for example, the Cu-removed (namely, pretreated) spent electrolyte contains 10.4 g/l of Cu, 3.3 g/l of As, 0.39 g/l of Sb and 0.023 g/l of Bi. In Example 2, the Cu-removed spent electrolyte contains 13.4 g/l of Cu, 2.8 g/l of As, 0.33 g/l of Sb and 0.036 g/l of Bi.

In the prior art processes such as Martin et al's it was considered advantageous to remove as much copper from the solution as possible before the solution was subjected to the treatment for removing the undesired impurities such as arsenic or the like. In addition, it was also considered advantageous to separate the impurities in the simplest possible form. It seems that all prior art processes then available were not free from such conventional way of thinking. Thus, the process of Martin et al takes a measure that will result in the formation of poisonous material such as arsenious acid and also it employs a troublesome method such as siphoning.

In contrast, by the process of the present invention, a substantial amount of copper is, "daringly", precipitated from an electrolytic solution together with a relatively small amount of impurities which must be removed. Accordingly, the precipitate thus produced contains a major amount of copper and minor amounts of impurities and so, it is suitable as part of raw material to be used in the smelting of copper. And more, by the process of the present invention, the removal of impurities from the spent electrolyte becomes more complete because of a substantial or a rather large amount of copper remaining in the pretreated solution to be co-precipitated with the undesired impurities which must be removed.

What is claimed is:

1. A method of treating a spent electrolytic solution containing a major amount of copper and a minor amount of various metal ion impurities containing at least arsenic, which method comprises the steps of:
   removing copper from said electrolytic solution in a pretreatment operation until the copper content is greatly reduced but still remains at a level which is substantially larger than the total of said impurities;
   passing hydrogen sulfide gas into said pretreated solution at an elevated temperature of 40° C. or higher until the redox potential is at least equal to a certain predetermined value to precipitate substantially all the copper together with said metal ion impurities present in the solution;
   filtering the thus treated solution to separate the precipitates as a residue which can be used as part of the raw material in the process of copper smelting from a filtrate consisting essentially of sulfuric acid; and
   returning the filtrate to a copper electrolytic cell for reuse.

2. The method as defined in claim 1 wherein said pretreated spent electrolyte contains 5 to 20 g/l of copper.

3. The method as defined in claim 1 wherein said pretreated spent electrolyte contains 8 to 15 g/l of copper.

4. The method as defined in claim 1 wherein said pretreated spent electrolyte contains 10 to 13 g/l of copper.

5. The method as defined in any of claims 1 to 4 wherein said electrolyte is one taken out of a cell for electrolytic refining of copper.

6. The method as defined in any of claims 1 or 4 wherein said pretreatment is carried out by electrolytic extraction of copper.

7. The method as defined in any of claims 1 to 4 wherein said temperature is in the range of 40° C. to 90° C.

8. The method as defined in any of claims 1 to 4 wherein said temperature is in the range of 50° C. to 70° C.

9. The method as defined in any of claims 1 to 4 wherein said temperature is about 60° C.

10. The method as defined in any of claims 1 to 4 wherein said redox potential is in the range of 200 mV to 300 mV.

11. The method as defined in any of claims 1 to 4 wherein said electrolytic potential is in the range of 230 mV to 280 mV.

* * * * *